United States Patent
Chen et al.

(10) Patent No.: US 6,477,432 B1
(45) Date of Patent: Nov. 5, 2002

(54) STATISTICAL IN-PROCESS QUALITY CONTROL SAMPLING BASED ON PRODUCT STABILITY THROUGH A SYSTEMATIC OPERATION SYSTEM AND METHOD

(75) Inventors: Shun-An Chen, Kaoshiung (TW); Tzu-Jeng Hsu, Taipei (TW); Ying-Wei Hsu, Hsin-Chu (TW); Constance Y. Chu, Hsin-Chu (TW)

(73) Assignee: Taiwan Semiconductor Manufacturing Company, Hsin-chu (TW)

( * ) Notice: Subject to any disclaimer, the term of this patent is extended or adjusted under 35 U.S.C. 154(b) by 0 days.

(21) Appl. No.: 09/480,269

(22) Filed: Jan. 11, 2000

(51) Int. Cl.[7] .............................................. G05B 13/02
(52) U.S. Cl. ........................... 700/51; 700/109; 700/32
(58) Field of Search ........................... 700/50–51, 109; 702/84, 179–181

(56) References Cited

U.S. PATENT DOCUMENTS

| | | | |
|---|---|---|---|
| 5,150,289 A | 9/1992 | Badavas | ....................... 700/34 |
| 5,465,221 A | 11/1995 | Merat et al. | ................... 702/83 |
| 5,497,331 A | 3/1996 | Iriki et al. | ................... 700/121 |
| 5,761,064 A * | 6/1998 | La et al. | ...................... 700/110 |
| 5,862,054 A | 1/1999 | Li | ............................... 700/121 |

* cited by examiner

Primary Examiner—Thomas Black
Assistant Examiner—Crystal J. Barnes
(74) Attorney, Agent, or Firm—George O. Saile; Stephen B. Ackerman; Graham S. Jones, II

(57) ABSTRACT

A system for managing quality control in a manufacturing plant for processing lots of work in process (WIP) for at least one product, comprises a manufacturing process which includes a manufacturing executive system (MES) which provides inspection data to a statistical process control (SPC) database, and an SPC analyzer for analyzing the inspection data and providing a sampling rate rule output to a sampling rate database. A server supplies the sampling rate rule to the MES. The MES tests a condition as to whether a lot of WIP should be sampled. If the condition is met, then provide an inspect control signal for inspection to the plant for inspecting the lot. If the condition is not met, then branch away from the control signal to provide an alternative control signal to pass on to the next process step in the plant.

20 Claims, 5 Drawing Sheets

KLA Sampling Rate Tuning

| Change Rule | Tune By Lot | Rule Base | Lot Rule |

Device

| | DEVICE C |
|---|---|
| 24 | TM6338 |
| 25 | TM6340 |
| 26 | TM6360 |
| 27 | TM6384 |
| 28 | TM6397 |
| 29 | TM6416 |
| 30 | TM6442 |
| 31 | TM6458 |
| 32 | TM6541 |
| 33 | TM6607 |
| 34 | TM6621 |
| 35 | TM6633 |
| 36 | TM6660 |

Technology

| | TECHNOLOGY |
|---|---|
| 1 | 0.25UM 6T_SRAM |
| 2 | 0.24UM DRAM |
| 3 | 0.25UM LOGIC |
| 4 | 0.30UM LOGIC |
| 5 | 0.35UM SRAM |
| 6 | 0.35UM LOGIC |
| 7 | 0.30UM SRAM |
| 8 | 0.50UM LOGIC |
| 9 | 0.45UM SRAM |

Recipe

| | TITLE | RECPID | RULE |
|---|---|---|---|
| 1 | GATE_ANNL | AXGAN4 | 1.5.9 |
| 2 | ILD_BPTS | AX1BP4 | Default |
| 3 | M1_ASI | AXM1E4 | Default |
| 4 | M1_AFI | AXM1S4 | Default |
| 5 | M2_ASI | AXM2E4 | Default |
| 6 | M2_AFI | AXM2S4 | Default |
| 7 | M3_ASI | AXM3E4 | Default |
| 8 | M3_AFI | AXM3S4 | Default |
| 9 | M4_ASI | AXM4E4 | Default |
| 10 | M4_AFI | AXM4S4 | Default |
| 11 | TIN_RML | AXNRM4 | 1.5.9 |
| 12 | PASS_DEP | AXPAD4 | Default |

Apply New Rule To
○ New Lot Only
○ New Lot and Current WIP

Select The Toil Number Of Lot Id which need KLA defect scan
☐ 0  ☐ 1  ☐ 2  ☐ 3  ☐ 4  ☐ 5  ☐ 6  ☐ 7  ☐ 8  ☐ 9

Apply  Close

*FIG. 4*

| KLA Sampling Rate Tuning | | | | |
|---|---|---|---|---|
| Change Rule | Tune By Lot | Rule Base | | Lot Rule |

Device                                     Technology         Recipe

| | DEVICE C | | TECHNOLOGY | | TITLE | RECPID | RULE |
|---|---|---|---|---|---|---|---|
| 37 | TM6665 | 1 | O 25UM 6T_SRAM | 1 | BR2_DEP | AXBRD9 | 0,1,2,3,4,5,6,7,8,9 |
| 38 | TM6666 | 2 | O 24UM DRAM | 2 | C1_ADI | AXC1P9 | Default |
| 39 | TM6693 | 3 | O 25UM LOGIC | 3 | C2_ADI | AXC2P9 | Default |
| 40 | TM6705 | 4 | O 30UM LOGIC | 4 | IP01_API | AX11M9 | Default |
| 41 | TM6811 | 5 | O 35UM SRAM | 5 | M2_ASI | AXM1E9 | 0,1,2,3,4,5,6,7,8,9 |
| 42 | TM7130 | 6 | O 35UM LOGIC | 6 | M1_ADI | AXM1P9 | Default |
| 43 | TM7347 | 7 | O 30UM SRAM | 7 | M2_ASI | AXM2E9 | 0,1,2,3,4,5,6,7,8,9 |
| 44 | TM7361 | 8 | O 50UM LOGIC | 8 | M2_ADI | AXM2P9 | |
| 45 | TM7362 | 9 | O 45UM SRAM | 9 | M3_ASI | AXM3E9 | 0,1,2,3,4,5,6,7,8,9 |
| 46 | TM7367 | | | 10 | M1C2_ADI | AXMCP9 | Default |
| 47 | TM7488 | | | 11 | P1_ASI | AXP1E9 | 0,1,2,3,4,5,6,7,8,9 |
| 48 | TM7503 | | | 12 | P1_ADI | AXP1P9 | |
| 49 | TM7531 | | | 13 | P2_API | AXP2M9 | 0,1,2,3,4,5,6,7,8,9 |

Apply New Rule To     Select The Toil Number Of Lot Id which need KLA defect scan
○ New Lot Only    □0 □1 □2 □3 □4 □5 □6 □7 □8 □9
○ New Lot and Current WIP    Apply    Close

FIG. 5

STATISTICAL IN-PROCESS QUALITY CONTROL SAMPLING BASED ON PRODUCT STABILITY THROUGH A SYSTEMATIC OPERATION SYSTEM AND METHOD

BACKGROUND OF THE INVENTION

1. Field of the Invention

This invention relates to quality control systems for a manufacturing process and more particularly to inspection sampling methods and systems therefor.

2. Description of Related Art

U.S. Pat. No. 5,150,289 of Badavas for "METHOD AND APPARATUS FOR PROCESS CONTROL" shows a process control system. A statistical process control system provides asymmetrical nonlinear automatic closed-loop feedback control. The system applies to the control of equipment that responds to a controlled variable signal to vary a measurable characteristic of a process. The system uses an accumulated deviation of a measured subgroup means minus a target value, divided by the subgroup standard deviation, to modify the manipulated variable each time the accumulated value exceeds a decision interval above or below the target. The system permits the use of independent slack variables subtracted from the accumulated deviation to model the underlying process more closely. The system permits the use of independent alarm values and variable gains to permit greater process control.

U.S. Pat. No. 5,497,331 of Iriki et al. for "SEMICONDUCTOR INTEGRATED CIRCUIT DEVICE FABRICATION METHOD AND ITS FABRICATION APPARATUS" discloses a quality control system for a semiconductor manufacturing line. A semiconductor integrated circuit device fabrication technique improves the accuracy of element qualities by considering the influence of interaction of element quality parameters in the quality control of semiconductor fabrication processes and also by improving the product yield estimation accuracy to improve production efficiency. First, an initial value of a membership function is set. Then element quality parameters and a combined quality parameter are expressed by membership functions in fuzzy control in a semiconductor fabrication apparatus for automating fabrication by connecting a computer with measuring instruments and processors by communication devices. The combined quality parameters are fuzzy-inferred from the element quality parameters using these membership functions. Inference rules are adjusted by data of the actual processes. Membership functions of the obtained element quality parameters are converted into an element quality control standard, and the semiconductor integrated circuit device fabrication processes are controlled according to the standard.

U.S. Pat. No. 5,465,221 of Merat et al. for "AUTOMATED PROCESS PLANNING FOR QUALITY CONTROL INSPECTION" shows an automated process planning for quality control inspections. A computer is used for generating a part inspection plan for a coordinate measuring machine, in a feature-based rapid design system, having a Feature-Based Design Environment, an Episodal Associative Memory, Fabrication Planning, and an Inspection Plan, with features which include form features which define the form or shape of the part, manufacturing features, inspection features, and geometric and design features. An Inspection Plan includes interaction means wherein the inspector interacts with the system to guide it to a desired results and the inspector can define setups, measurement points, sequence for the points, and the via points. A learning process is included so that desired sequence input from the inspector is sent to discovery means to organize patterns and to define rules. This creates a self-improving expert system by recalling relevant past experiences, and learning from the desired sequence input from the inspector.

Commonly assigned U.S. Pat. No. 5,862,054 of Li for "PROCESS MONITORING SYSTEM FOR REAL TIME STATISTICAL PROCESS CONTROL" shows a method of monitoring for real time process control. The method monitors process parameters from multiple process machines to provide real time statistical process control (SPC). The implementation applied to ion implantation of wafers. The method has applicability where there are a number of process machines having a number of process parameters and close continuous sampling of data is required. The process parameters are collected on a single computer over a single network, and each parameter is analyzed and displayed separately for each process and process machine. Statistical variables like Cp and Cpk are calculated and presented on the computer screen along with graphs of the various parameters for a particular process machine. Data is aged out of the computer to an archival database under the control of a manufacturing information system and connected to a company wide network.

SUMMARY OF THE INVENTION

This invention teaches a statistical in-process quality control sampling system which adjusts the sampling rate dynamically.

There are many inspection steps defined in manufacturing process to find defects when the process is being tested for the first time. In addition, for a new product, a heavy burden of inspection work is also necessary. However, for a mature product, in order to save costs the inspection sampling rate may be reduced.

Objects of this invention are as follows:
1. Reduce inspection cost and keep high product quality.
2. Adjust the inspection sampling frequency by process stability dynamically.
3. Provide a systematic method for controlling the inspection sampling frequency.

In this invention, the stability of the process is considered to be a factor to be considered in selection of the appropriate sampling rate setting. A systematic management and operation method is also designed to guarantee that the dynamic sampling inspection steps are executed exactly as required for optimum performance.

Advantages of this invention are as follows:
1. The invention provides systematic setting of the sampling frequency rule based on process stability data to reduce inspection cost and keep high product quality.
2. This is a systematic method to manage the inspection operation.

In accordance with this invention, a system and method for managing quality control in a manufacturing plant for processing lots of work in process (WIP) for at least one product, comprises a manufacturing process which includes a manufacturing executive system (MES) which provides inspection data to a statistical process control (SPC) database, and an SPC analyzer for analyzing the inspection data and providing a sampling rate rule output to a sampling rate database. A server supplies the sampling rate rule to the MES. The MES tests a condition as to whether a lot of WIP should be sampled. If the condition is met, then provide an inspect control signal for inspection to the plant for inspecting the lot. If the condition is not met, then branch away from the control signal to provide an alternative control signal to pass on to the next process step in the plant. Preferably, the sampling rate rule is adjusted dynamically to adjust the sampling rate ratio. The SPC database stores the inspection data of products in the plant and the SPC analyzer provides analysis of the inspection sampling frequency of products in the plant; a sampling rate control under operator control for modification of the sampling rate rule in the sampling rate database. The server provides a background server function.

BRIEF DESCRIPTION OF THE DRAWINGS

The foregoing and other aspects and advantages of this invention are explained and described below with reference to the accompanying drawings, in which:

FIGS. 4 and 5 show implementations of a Statistical In-Process Quality Control system.

DESCRIPTION OF THE PREFERRED EMBODIMENT

Figures 1, 2:
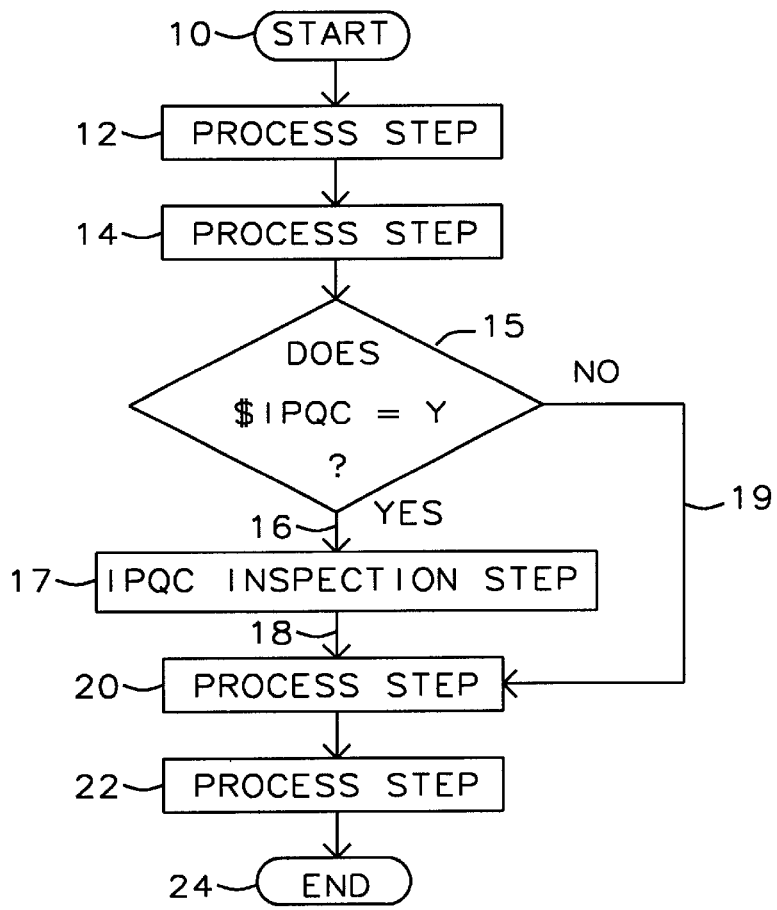
FIG. 1 is a flow chart which shows the process procedure of this invention which provides inspection condition steps definition in a Manufacturing Executive System (MES) which is stored in the system.
FIG. 2 is a diagram of the design concept of this invention.

FIG. 1 is a flow chart which shows the process procedure P of this invention which provides inspection condition steps definition in a Manufacturing Executive System (MES) which is stored in the system. In order to support the function provided by this invention, a set of execution steps are provided in a Manufacturing Executive System. The program begins with START 10 which leads to regular process step 12 and process step 14 which are performed sequentially. After process step 15, the program leads to the test 15 "Does $IPQC=Y?". If the answer in test 15 is YES, the program proceeds along line 16 to IPQC inspection step 17. Then the program proceeds along line 18 to process step 20. If the answer in test 15 is NO, the program proceeds along line 19 to step 20. Without the test 15 of this invention, the process would proceed from process step 14 to the IPQC inspection step 17 and then along line 18 to the process step 20. Thus all lots would be required to go through the inspection steps defined in the process procedure. The only way to modify the process procedure would be to manage by manual intervention to provide instructions.

In accordance with this invention, the extra test step 15 is provided which comprises a test with a conditional branch 19 before the IPQC inspection (In-Process Quality Control) step 17.

The IPQC inspection test is defined in the test step 15 is as follows:

$$DOES\ \$IPQC=Y? \tag{1}$$

where $IPQC$=In-Process Quality Control Value

Y=Desired Quality Control Value

If the value of $IPQC equal Y, the result of the test is YES and the lot proceeds on line 16 to the inspection step 17. Then an inspection will be performed by an operator. If the result of the test is not (the condition is false), then the branch line 19 divert the process to the next process step 20 and the lot being processed automatically bypasses the IPQC inspection step 17.

An advantage of this invention is that the operator does not need to remember the sampling frequency. Another advantage of this invention is that the lot which does require inspection by the IPQC inspection step 17 will be inspected without fail. After process step 20 the production line proceeds to process step 22 which lead to the END 24 of this phase of production in this exemplary system.

Figure 3:
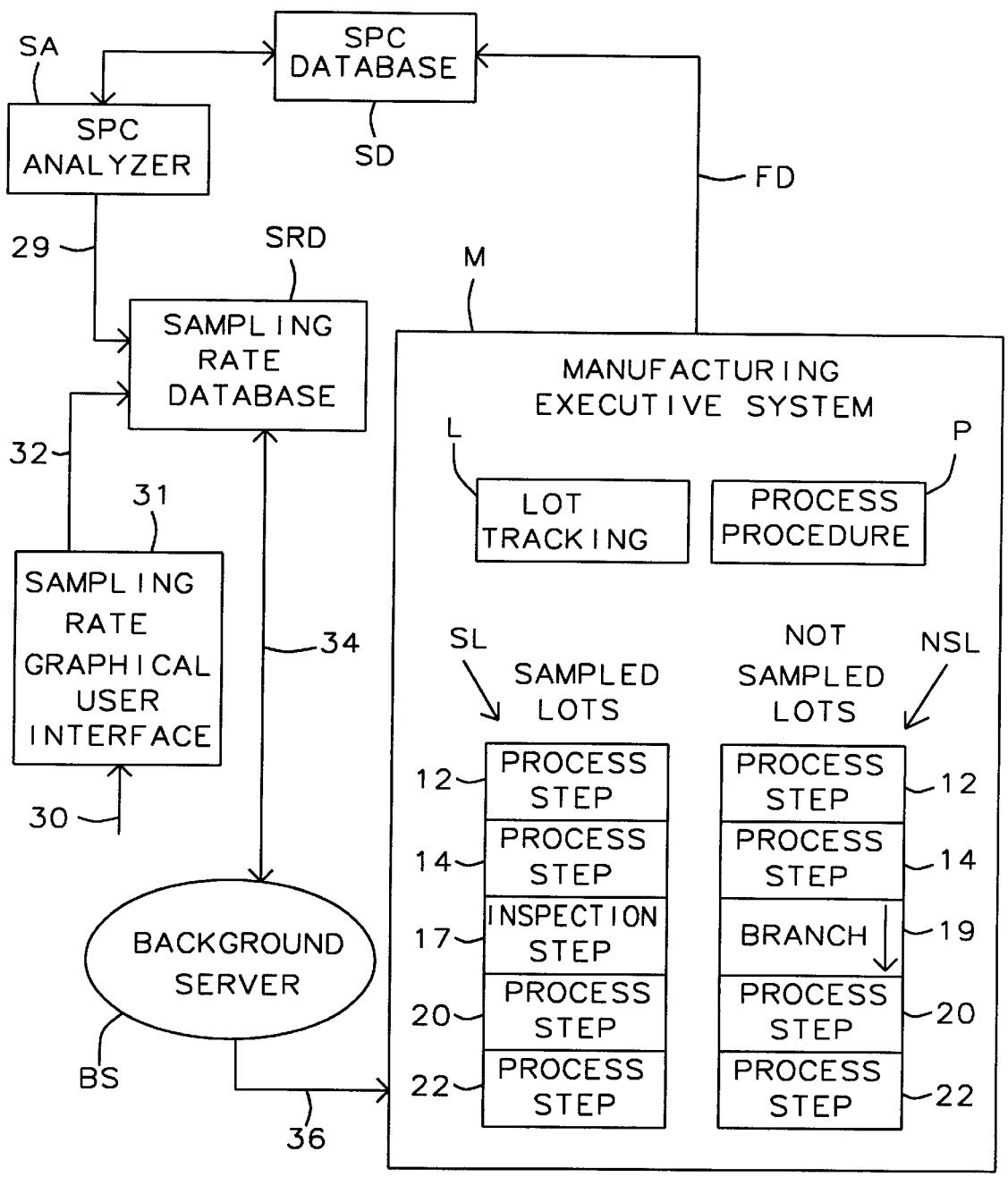
FIG. 3 shows statistical In-Process Quality Control System Architecture in accordance with this invention which is implemented in the system of FIG. 6.
Figure 6:
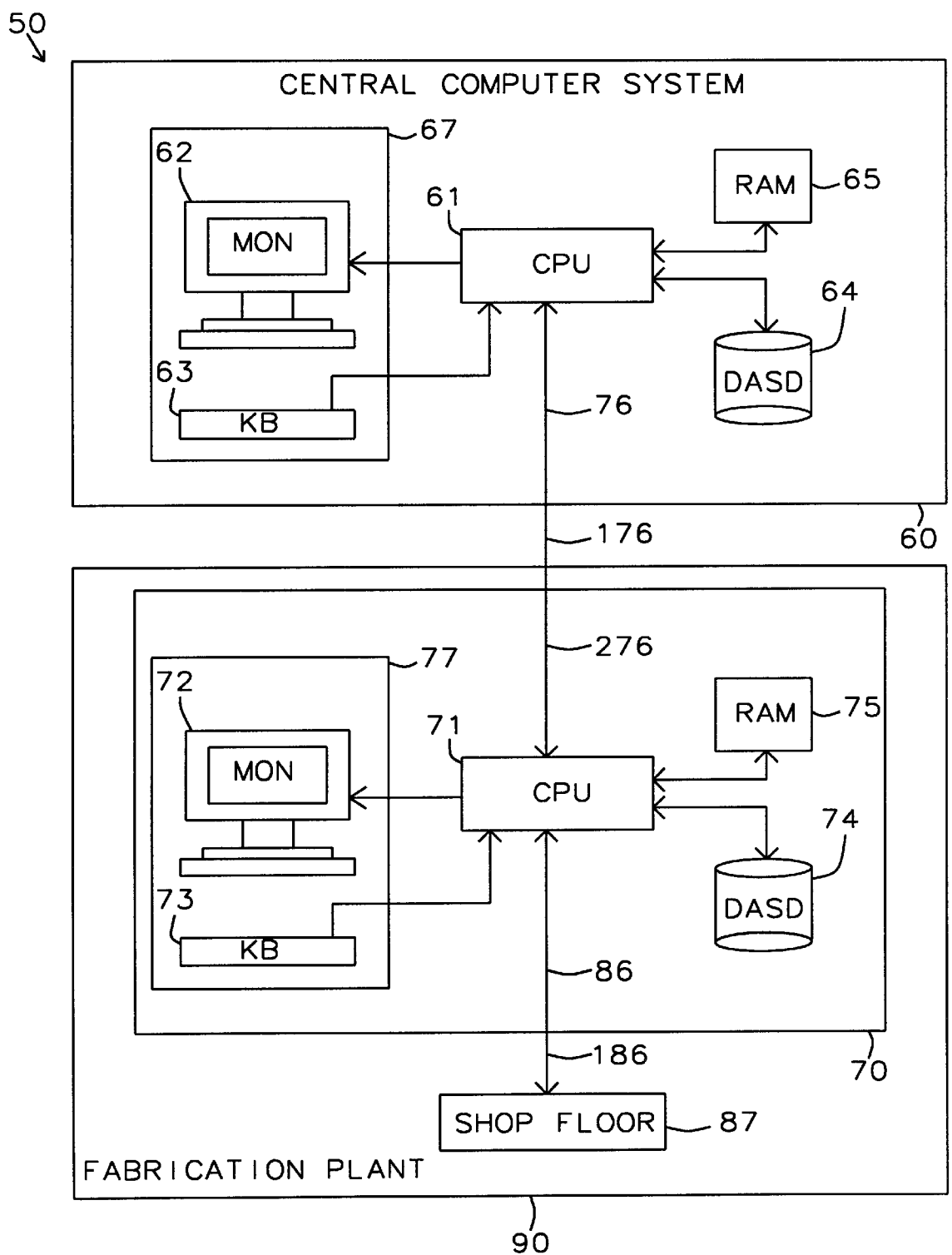
FIG. 6 shows a manufacturing plant which includes a central computer system and. a fabrication plant with a shop floor where products, such as semiconductor chips, are being manufactured and a computer system for allocating fabrication plant resources employing the Statistical in-process Quality Control Sampling Based on product stability through a Systematic Management Operation (SQCSBSMO) system and method in accordance with this invention.

FIG. 3 shows statistical In-Process Quality Control System Architecture in accordance with this invention which is implemented in the system of FIG. 6 as will be understood by those skilled in the art. A Manufacturing Executive System (MES) M includes a lot tracking function L and a process procedure function P. The MES M also produces the sampled lots results SL with the processing steps of FIG. 1 schematically shown therein in sequence and the not sampled lots result NSL with the processing steps of FIG. 1 including the branch 19 shown therein in sequence. The MES M forwards inspection data and results on line FD to the Statistical Process Control (SPC) database SD which stores the inspection data of every product in the plant. The SPC analyzer SA analyzes the data in SPC database SD to determine the sampling rate of different products according to the analysis result from analyzing data in SPC database SD. The sampling rate determination is provided by the SPC Analyzer SA on line 29 to the Sampling Rate Database SRD. A background server BS is used to monitor the sampling rate database SRD via connection line 34. The background server BS reads the sampling rate database SRD and dynamically changes the process route between the sampled lots route SL and the not sampled lots route NSL by providing inputs to MES M on line 36. Thus, in summary, the background server BS sets the condition according to the Sampling Rate Database SRD. When the condition is met with a YES in test 15 in FIG. 1, then execution of the IPQC inspection step 17 for the sampled lots route SL will be forced for the lot being processed. If the condition is not met because of a NO in test 15 in FIG. 1, then lots will not go to the IPQC inspection step 17 and the cost of inspection is saved.

In summary, if the condition is true (YES), the route will enter IPQC inspection step 17; but if the condition is false (NO) the route will skip the IPQC step 17 and go to the next process step 20.

A sampling rule input signal is applied, dynamically, on input line 30 to a sampling rate graphical user interface (SRGUI) 31. The SRGUI 31 is connected by output line 32 to supply the sampling rule input signal to the sampling rate database SRD.

A process engineer or a quality control engineer has the authority to tune the inspection sampling rate dynamically sampling rule input signal on line 30 to the real world quality requirements. The output on line 32 from SRGUI 31 is provided to support that tuning function. Thus the user tunes the sampling rate in sampling rate data base SRD according to the real situation with the input from line 30.

In summary, the system of FIG. 3 performs the tasks as follows:
1. SPC database SD keeps the inspection data of every product in the plant.
2. SPC analyzer SA analyzes the inspection sampling frequency and decides the sampling rate of products in the plant and sets the rule in the sampling rate database SRD.
3. The background server BS gets the sampling rate rule from the database SRD and sets the IPQC decision parameters for the MES M.
4. MES M forwards inspection data and results to SPC database SD.
5. Line 30 dynamically samples the rule input. That is to say that the user tunes the sampling rate according to the real situation.

FIG. 2 is a schematic illustration of the design concept of this invention using a systematic method for adjusting the inspection sampling frequency dynamically, as further illustrated in TABLE I.

TABLE I

| Process Stability | Inspection Sampling Rate | |
|---|---|---|
| | Fraction | Percent |
| Low | 1 | 100% |
| Middle | ½ | 50% |
| High | ⅓ | 33% |
| Middle | ½ | 50% |

When a new product is put into mass production, the SPC Analyzer will set the initial sampling rate to be 1 (100% inspection), so that all the lots of the product will go through the inspection steps since low process stability is presumed as seen in the top row in FIG. 2 and Table I. As the product matures step-by-step, the SPC Analyzer SA will make the determination that the stability has increased. Thus, the SPC Analyzer SA will reduce the sampling rate automatically according to the inspection result. If the product becomes worse as determined from quality control data, the SPC Analyzer SA will make that determination, i.e. realize that performance is deteriorating and the sampling rate will be increased to guarantee the quality until the quality becomes stable again. After the product matures further, the inspection rate will be reduced by the SPC Analyzer SA automatically. The middle 50% inspection level and high stability 33% inspection level are illustrated in FIG. 2 and Table I. The middle 50% inspection level and high stability 33% inspection level are shown as every other lot and every third lot respectively, in FIG. 2.

Thus there is a dynamically sampling rule input. In addition, there is a read sampling rate database and the system dynamically changes the process route.

The sampling rate graphical user interface (SRGUI) 31 provides both the setting and displaying function for the lots for different products. A process engineer or quality engineer can adjust the inspection sampling rate in a special case. The adjusted inspection sampling rate signal will overwrite the setting rule in the sampling rate database SRC which had been generated by the SPC Analyzer SA. An engineer can also check the rule or lot behaviors through the sampling rate graphical user interface (SRGUI) 31.

FIGS. 4 and 5 show implementations of a Statistical In-Process Quality Control system.

FIG. 6 shows a manufacturing plant which includes a central computer system and a fabrication plant with a shop floor where products, such as semiconductor chips, are being manufactured and a computer system for allocating fabrication plant resources employing the Statistical in-process Quality Control Sampling Based on product stability through a Systematic Management Operation (SQCSBSMO) system and method in accordance with this invention.

Referring again to FIG. 1 the flow chart of the SQCSBSMO system shown there is provided by the computer control system of FIG. 6. The flow chart of FIG. 1 of this invention and the SQCSBSMO system programs which operate the plant 90 seen in FIG. 6 are stored in computer systems 60 and 70 in FIG. 6 which is described in more detail below.

The computer program in accordance with this invention is preferably resident in a site in the fabrication plant computer system 70 which is preferably connected, as shown in FIG. 6, as a part of the overall computer system with the central computer system 60, which is an alternative site for the computer program of this invention. Referring again to FIG. 6, the computer system 70 operates as an integral part of the fabrication plant 90 and so it is shown located within the plant 90, but it may be located elsewhere, as will be obvious to those skilled in the art and it can be a portion of an overall consolidated system incorporating the central computer system 60 and can operate independently as a matter of choice.

The central computer system 60 shown in FIG. 6 comprises a CPU (Central Processing Unit) 61, a terminal 67 with a monitor 62 connected to the CPU 61 for receiving data from the CPU 61 and a keyboard 63 connected to the CPU 61 for sending data respectively to the CPU 61. A RAM (Random Access Memory) 65 and a DASD 64 associated with the CPU 61 are shown connected for bidirectional communication of data to and from CPU 61.

Lines 76, 176 and 276 provide for interconnections between the CPU 61 of system 60 to the CPU 71 of the fabrication plant computer system 70. Line 176 connects between lines 76 and 276 at the interfaces of computer 60 and a factory control computer system 70 respectively.

The factory control computer system 70 comprises a CPU 71, a terminal 77 with monitor 72 connected to the CPU 71 for receiving data respectively from the CPU 71 and keyboard 73 connected to the CPU 71 for sending data respectively to the CPU 71. A random access memory 75 and a DASD 74 associated with the CPU 71 are shown connected for bidirectional communication of data to and from CPU 71. Line 86 connects from CPU 71 to line 186 connects through the factory control computer 70 interface to the shop floor system 87. A layout viewer can be connected to the CPU 71 to display error flags generated by the pattern for use by the operator of the computer system 70.

The system 50 includes the hardware and the data defining the SQCSBSMO system for the plant 90. The SPC database SD can be stored in one of the DASD unit 64, DASD unit 74, RAM 65 or RAM 75, as desired, in a conventional manner, as will be well understood by those skilled in the art.

SUMMARY

The system of this invention provides as follows:
1. Statistical In-Process Quality Control sampling by product maturity and stability.
2. Systematic management for control of the rate of inspection execution.
3. Dynamically tuning the sampling rate according to the real situation based upon feedback data reflecting the stability of the process being sampled.

The statistical in-process quality control system of this invention samples by the factor of designed product stability.

The systematic management method adjusts the inspection sampling ratio dynamically and controls inspection operation.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A system for managing quality control in a manufacturing plant for processing lots of work in process (WIP) for at least one product, comprising:

a manufacturing process includes a manufacturing executive system (MES) which provides inspection data to a statistical process control (SPC) database, an SPC analyzer for analyzing said inspection data and providing a sampling rate rule output to a sampling rate database, a server for supplying said sampling rate rule to said MES, said MES testing a condition as to whether a lot of WIP should be sampled, if said condition is met providing an inspect control signal for inspection to said plant for inspecting said lot, and if said condition is not met, then branching away from said control signal to provide an alternative control signal to pass on to the next process step in said plant.

2. The system of claim 1 wherein:

said server provides a background server function.

3. The system of claim 1 wherein said sampling rate rule is adjusted dynamically to adjust the sampling rate ratio.

4. The system of claim 3 including a sampling rate control under operator control for modification of said sampling rate rule in said sampling rate database.

5. The system of claim 1 wherein:

said SPC database stores the inspection data of products in said plant, and said SPC analyzer provides analysis of the inspection sampling frequency of products in said plant.

6. The system of claim 5 wherein said sampling rate rule is adjusted dynamically to adjust the sampling rate ratio.

7. The system of claim 6 including a sampling rate control under operator control for modification of said sampling rate rule in said sampling rate database.

8. The system of claim 7 wherein:

said server provides a background server function.

9. A method for managing quality control in a manufacturing plant for processing lots of work in process (WIP) for at least one product, comprising:

providing a manufacturing process including a manufacturing executive system (MES) which provides inspection data to a statistical process control (SPC) database, providing an SPC analyzer for analyzing said inspection data and providing a sampling rate rule output to a sampling rate database, supplying said sampling rate rule to said MES, using said MES to test a condition as to whether a lot of WIP should be sampled, if said condition is met providing an inspect control signal for inspection to said plant for inspecting said lot, and if said condition is not met, then branching away from said control signal to provide an alternative control signal to pass on to the next process step in said plant.

10. The method of claim 9 wherein:

said server provides a background server function.

11. The method of claim 9 including adjusting said sampling rate rule dynamically to adjust the sampling rate ratio.

12. The method of claim 11 including an operator controlling the sampling rate for modification of said sampling rate rule in said sampling rate database.

13. The method of claim 9 including:

storing the inspection data of products in said plant in said SPC database, and providing analysis of the inspection sampling frequency of products in said plant with said SPC analyzer.

14. The method of claim 13 wherein said sampling rate rule is adjusted dynamically to adjust the sampling rate ratio.

15. The method of claim 14 including an operator controlling the sampling rate for modification of said sampling rate rule in said sampling rate database.

16. The method of claim 15 wherein said server provides a background server function.

17. A system for managing quality control in a manufacturing plant for processing lots of work in process (WIP) for at least one product, comprising:

a manufacturing process includes a manufacturing executive system (MES) which provides inspection data to a statistical process control (SPC) database for storing the inspection data of products in said plant, an SPC analyzer for analyzing said inspection data and providing a sampling rate rule output to a sampling rate database, a server for supplying said sampling rate rule to said MES, said server providing a background server function, said MES testing a quality control condition as to whether a lot of WIP should be sampled, if said quality control condition is met an inspect control signal for inspection is provided to said plant for inspecting said lot, and if said condition is not met, then the system branches away from said control signal to provide an alternative control signal to pass on to the next process step in said plant.

18. The system of claim 17 wherein said SPC analyzer provides analysis of the inspection sampling frequency of products in said plant.

19. The system of claim 17 wherein said sampling rate rule is adjusted dynamically to adjust the sampling rate ratio.

20. The system of claim 19 including a sampling rate control under operator control for modification of said sampling rate rule in said sampling rate database.

* * * * *

UNITED STATES PATENT AND TRADEMARK OFFICE
CERTIFICATE OF CORRECTION

PATENT NO.    : 6,477,432 B1
DATED         : November 5, 2002
INVENTOR(S)   : Shun-An Chen et al.

It is certified that error appears in the above-identified patent and that said Letters Patent is hereby corrected as shown below:

<u>Title page,</u>
Item [54], add the word -- MANAGEMENT -- to the title so that it reads;
-- STATISTICAL IN-PROCESS QUALITY CONTROL SAMPLING BASED ON PRODUCT STABILITY THROUGH A SYSTEMATIC MANAGEMENT OPERATION SYSTEM AND METHOD --.

Signed and Sealed this

Eighteenth Day of March, 2003

JAMES E. ROGAN
*Director of the United States Patent and Trademark Office*